: 3,537,315
Patented Nov. 3, 1970

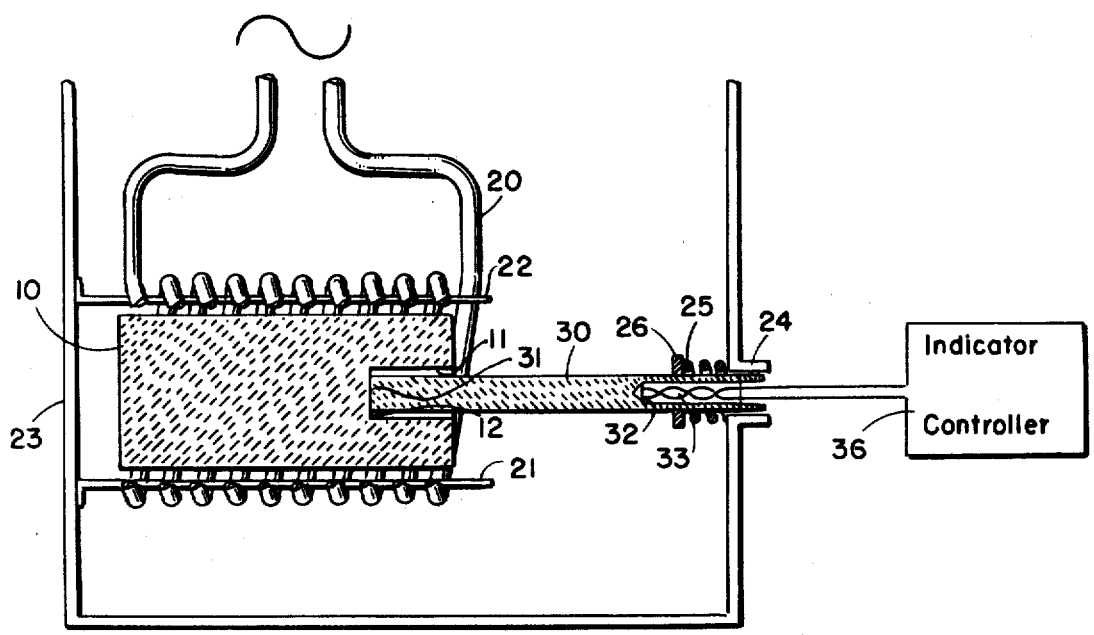

---

3,537,315
TEMPERATURE SENSING DEVICE
Robert G. Ames, Cresskill, N.J., assignor to National Beryllia Corp., Haskell, N.J., a corporation of New Jersey
Filed July 29, 1968, Ser. No. 748,545
Int. Cl. G01k 1/16, 7/04
U.S. Cl. 73—362.8           2 Claims

ABSTRACT OF THE DISCLOSURE

A device for measuring the temperature of devices in electromagnetic fields is provided which comprises a probe consisting essentially of beryllium oxide adapted to contact the device whose temperature is to be measured and conduct heat from the device to a temperature indicator outside of the electromagnetic field.

---

This invention relates to a device for measuring temperatures in an electromagnetic field.

In many instances it is necessary to obtain the temperature of a point or object within an electromagnetic field. If a thermocouple or any object containing a metal is inserted into an electromagnetic field, however, the object disturbs the field and can cause the means creating the field to work imperfectly or can itself be affected by the field so as to give an incorrect reading.

Among the objects of the invention is to provide a device which can be inserted into an electromagnetic field and, if desired, into contact with an object whose temperature it is important to know without adversely affecting the field itself and without being influenced by the field, per se, to give an incorrect reading.

The objects of the invention are attained by providing a temperature sensing probe which is inert to the electromagnetic field and which has a high heat conductivity to conduct heat from the object or point whose temperature is to be measured to an area or point outside of the limits or range of the electromagnetic field. Thus, the heat conducting probe consists essentially of beryllium oxide. Said probe may be a sintered rod, cup or similar probe-like object consisting almost entirely of BeO, or it may be a sintered ceramic rod, cup or similar probe-like object, containing over about 66% BeO, with the remainder being ceramic oxides, silicates, nitrides, etc., which are inert to electromagnetic fields or the probe may contain over about 66% BeO in a matrix of resin which is inert to the electromagnetic field and is not adversely affected by the temperatures that are to be measured. When it is stated that the probe is formed essentially of beryllium oxide, it will be understood that it contains at least 66% BeO, the remainder being substances which are unaffected in an electromagnetic field as defined above.

As indicated, the probe extends beyond the limits or range of the electromagnetic field and is connected at a point outside the field with a suitable temperature sensing device which may be a thermocouple, a bimetallic mechanical thermosensitive device, an ordinary capillary tube type of thermal sensing device, a heat sensitive pill or fuse, a thermistor, a heat sensitive salt capsule, or heat sensitive paint. The temperature sensing device may comprise part of a safety switch or of a control device, such as a servomotor, for example.

The invention will be illustrated by a device for measuring and recording the temperature of a magnetic tuning slug in an electromagnetic inductance coil. While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawing forming a part of the application:

The figure is a side cross-sectional view of the device as applied to the measurement of temperature of a magnetic tuning slug.

The figure shows a magnetic tuning slug 10 held inside of the inductance coil 20 by means of the non-magnetic arms 21, 22, etc. which in turn are supported from the frame 23. The slug 10 is provided with a well or bore having a planar end or bottom wall 12. The provision of the bore with the flat end wall is not essential to the operation of the device, but has some advantages and such bores can be provided where they do not adversely affect the function of the object whose temperature is to be measured. Surface to surface contact between the end of probe 30 and a portion of the slug 10 is desired and in this case, the surface to surface contact is obtained by making the end or bottom 12 of bore 11, flat, and the end 31 of probe 30, also flat. Where the temperature of a tube in such a field is to be measured for example, the end surface of the probe is shaped to make surface to surface contact. The probe 30 is slidably mounted in a ring 24 of the supporting frame 23 and is uniformly pressed by means of spring 25 and collar 26 against the flat end 12 of the hole in slug 10. Held within opening 32 of the probe 30 is a thermocouple 33 or other temperature measuring or indicating device. In the apparatus shown, the thermocouple 33 is connected to an indicator or controller 36.

The magnetic slug 10 may be made of a ceramic ferrite or of a magnetic metal or alloy. Regardless of what material it is made, the magnetic properties of the slug will vary as the temperature changes and if its temperature goes higher than its Curie point, the magnetic properties thereof, and its effectiveness in improving the Q or controlling the frequency of the circuit, will likewise rapidly decrease. The apparatus can also be calibrated by making use of ferrit cores of known Curie point.

Probe 30 may be formed (1) of a sintered ceramic rod consisting of over 97% BeO, (2) of a rod containing about 80% Be and 20% $Al_2O_3$ or similar ceramic oxide, and (3) of a rod containing 66% BeO microspheres embedded in epoxy, polyester, phenolaldehyde or silicon resins. Where a resin matrix probe is employed, the temperature to be measured must obviously be below the decomposition temperature thereof.

The features and principles underlying the invention described above in connection with specific exemplifications will suggest to those skilled in the art many other modifications thereof.

I claim:
1. As a device for measuring the temperature of an object within the electromagnetic field, the combination of a heat conducting, substantially rigid, probe having a first end thereof extending into the electromagnetic field adjacent the region of the object whose temperature is to be measured and the second end thereof extending beyond the limits of said field, means for holding the probe against the object whose temperature is to be measured, and means for sensing the temperature of the probe at said second end thereof, said probe being formed essentially of beryllium oxide whereby heat is conducted from the first end thereof to the second end without disturbing the characteristics of said electromagnetic field.

2. The device as claimed in claim 1 wherein the first end of the probe is shaped to make surface to surface contact with the object whose temperature is to be measured, and the means for holding the probe against the latter comprises resilient means for resiliently pressing said first end portion of said probe into contact with said object.

References Cited

UNITED STATES PATENTS

| | | | |
|---|---|---|---|
| 1,358,071 | 11/1920 | Fulton | 73—362.8 |
| 2,374,055 | 4/1945 | Treanor | 73—350 |

OTHER REFERENCES

Handbook of Chemistry and Physics, thirty-first edition, last copyright 1949, editor in chief Hodgman, page relied on 2017.

LOUIS R. PRINCE, Primary Examiner

D. E. CORR, Assistant Examiner

U.S. Cl. X.R.

73—343